United States Patent
Liao et al.

(10) Patent No.: US 8,580,916 B2
(45) Date of Patent: Nov. 12, 2013

(54) STABLE SOLUTION OF THE POLYMER PREPARED FROM N,O-HETEROCYCLES AND ITS PREPARATION METHOD AND USE

(75) Inventors: Shih-Hao Liao, Chupei (TW);
Chih-Wei Liao, Chupei (TW);
Hsuan-Hao Hsu, Chupei (TW);
Hsien-Te Chen, Chupei (TW);
Tsung-Hsien Lin, Chupei (TW)

(73) Assignee: Taiwan Union Technology Corporation, Chupei, Hsinchu County (TW)

( * ) Notice: Subject to any disclaimer, the term of this patent is extended or adjusted under 35 U.S.C. 154(b) by 307 days.

(21) Appl. No.: 12/966,274

(22) Filed: Dec. 13, 2010

(65) Prior Publication Data
US 2012/0059096 A1    Mar. 8, 2012

(30) Foreign Application Priority Data

Sep. 2, 2010    (TW) ............................. 99129640 A (51) Int. Cl.
*C08G 59/00*    (2006.01)
(52) U.S. Cl.
USPC ........... 528/403; 524/612; 524/717; 528/408; 528/422
(58) Field of Classification Search
USPC .................... 524/612, 717; 528/403, 408, 422
See application file for complete search history.

(56) References Cited

U.S. PATENT DOCUMENTS

| | | | |
|---|---|---|---|
| 6,005,064 A | 12/1999 | Hirai et al. | |
| 6,225,440 B1 | 5/2001 | Ishida | |
| 2004/0138345 A1 | 7/2004 | Aizawa et al. | |

FOREIGN PATENT DOCUMENTS

| | | |
|---|---|---|
| CN | 1115772 A | 1/1996 |
| DE | 2255504 A1 | 11/1973 |
| DE | 2323936 A1 | 12/1973 |
| GB | 1437814 A1 | 6/1976 |
| TW | 201732 | 3/1993 |
| TW | I307707 | 3/2009 |

OTHER PUBLICATIONS

English translation of abstract of CN 1115772 A.
English translation of abstract of TW I307707.

*Primary Examiner* — Edward Cain
(74) *Attorney, Agent, or Firm* — McClure, Qualey & Rodack, LLP (57) ABSTRACT

A stable solution of the polymer prepared from N,O-heterocyclic compound and its preparing method are provided, wherein the stable solution is prepared by making the N,O-heterocyclic compound of formulae I or II carry out a ring-opening polymerization:

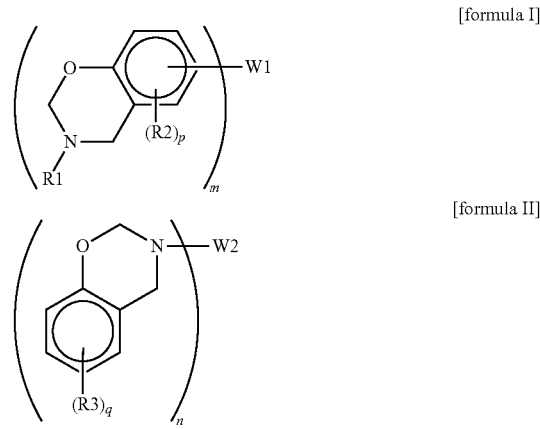

wherein R1 to R3, W1, W2, m, n, p and q are as defined in the specification. The stable solution can be used as a hardener for curing epoxy resin.

11 Claims, 2 Drawing Sheets

STABLE SOLUTION OF THE POLYMER PREPARED FROM N,O-HETEROCYCLES AND ITS PREPARATION METHOD AND USE

This application claims priority to Taiwan Patent Application No. 099129640 filed on Sep. 2, 2010.

CROSS-REFERENCES TO RELATED APPLICATIONS

Not applicable.

BACKGROUND OF THE INVENTION

1. Field of the Invention

The present invention relates to a stable solution of the polymer prepared from an N,O-heterocyclic compound and its preparation method. Specifically, the present invention relates to a stable polymer solution and its preparation method, wherein the polymer is prepared from an N,O-heterocyclic compound and the gel time of which can be optionally regulated.

2. Descriptions of the Related Art

In the plastics industry, benzene derivatives containing a N,O-heterocycle with the structure of are generally used in the polymerization matrix of thermal-setting polymers. The N,O-heterocycle-containing benzene derivatives can be to a high proportion of benzene rings and C—N bonds in the structure, the phenol structure-containing polymer possesses excellent thermal properties (such as thermal resistance, high glass transition temperature (Tg) and flammability), chemical properties and mechanical properties. In addition, after the ring-opening polymerization is carried out, the polymer of the N,O-heterocycle-containing benzene derivative is provided with a great amount of hydroxyl groups in the structure and can further react with the other monomers. The patents related to the ring-opening polymerization of N,O-heterocycle-containing benzene derivatives are, for example, DE 2255504 and DE 2323936. These patents are incorporated here by reference.

It is known that N,O-heterocycle-containing benzene derivatives can be added in small amount to serve as a hardener in the polymerization of epoxy resin, in which the benzene derivatives conduct the ring-opening polymerization and hydroxyl groups are generated therefrom. The generated hydroxyl groups further react with the epoxy resin to impart better mechanical, chemical and physical properties, such as low hygroscopicity, high glass transition temperature, better size stability, good electric properties etc. to the epoxy resin. The application of the N,O-heterocycle-containing benzene derivatives as a hardener may refer to, for example, TW 1307707, CN 1115772A and U.S. Pat. No. 6,005,064. These patents are incorporated herein by reference.

However, there are many limitations in the applications of known N,O-heterocycle-containing benzene derivatives. For example, TW 201732 and U.S. Pat. No. 6,005,064 both disclose methods for producing N,O-heterocycle-containing benzene derivatives by polymerizing phenol compounds, aldehyde compounds and primary amines. Nevertheless, the N,O-heterocycle-containing benzene derivatives provided by the methods possess poor solubility in solvents and tend to precipitate at room temperature due to oversaturation, and is thereby inconvenient for storage and use.

In addition, there are also applications regarding the self ring-opening polymerization of N,O-heterocycle-containing benzene derivatives, such as U.S. Pat. No. 6,225,440, which enable a N,O-heterocycle-containing benzene derivative to carry out a ring-opening polymerization at a lower temperature (may be lower to −60° C.) in the presence of a cationic initiator. However, this invention cannot control the molecular weight of the prepared polymer well and the halogen compounds used as an initiator for carrying out the ring-opening polymerization will remain in the final products. Under the demand of free-halogen materials at present, the value of the final products is suppressed due to the presence of halogen compounds.

Moreover, when used as a hardener of epoxy resin, N,O-heterocycle-containing benzene derivative always needs to be maintained at a temperature over 200° C. for a while before reacting with the epoxy resin, and its application scope is thereby limited. Besides, when applying the polymer of, for example, U.S. Pat. No. 6,225,440, the hardening time of epoxy resin and the properties of final products will be severely influenced due to the uncertainty of the molecular weight of the polymer.

In view of the above, the present invention provides a method for providing a stable solution of a polymer prepared from an N,O-heterocyclic compound. The method can initiate/terminate the ring-opening polymerization of the N,O-heterocyclic compound by temperature control without using a catalyst or promoter or the like. In addition, the gel time of the polymer in the stable solution may be regulated by controlling the reaction temperature and the reaction time to broaden its application scope and raise the product quality stability of the target (e.g., epoxy resin) on which it is applied.

SUMMARY OF THE INVENTION

An aspect of the present invention is to provide a method for providing a stable solution of a polymer prepared from an N,O-heterocyclic compound, comprising:

(a) dissolving an N,O-heterocyclic compound of formula I or formula II into a first solvent to form a first reaction solution:

[Formula I]

[Formula II]

wherein,
R1 to R3 are independently selected from the group consisting of H, a halogen, a substituted or unsubstituted C1-C10 alkyl group, a substituted or unsubstituted C1-C10 cycloalkyl group, and a substituted or unsubstituted C6-C20 aryl group;
W1 and W2 are independently selected from the group consisting of H, a halogen, an ether group, a thioether group, a sulfonyl group, a sulfinyl group, a carbonyl group, a substituted or unsubstituted C1-C10 alkyl group, a substituted or unsubstituted C1-C10 cycloalkyl group and a substituted or unsubstituted C6-C20 aryl group;
m and n are independently an integer ranging from 1 to 4;
p is an integer ranging from 1 to 3; and
q is an integer ranging from 1 to 4;
(b) heating the first reaction solution to a first temperature to carry out a ring-opening polymerization; and
(c) cooling the first reaction solution to a second temperature to substantially terminate the ring-opening polymerization,
wherein, the first solvent is unreactive to the N,O-heterocyclic compound; the first temperature is higher than the softening point of the N,O-heterocyclic compound and lower than the boiling point of the first solvent; and the second temperature is lower than the first temperature.

Another aspect of the present invention is to provide a stable solution of a polymer prepared from an N,O-heterocyclic compound, which is prepared by the above method. The stable solution is used as a hardener for the curing of the epoxy resin.

Therefore, yet another aspect of the present invention is the use of utilizing the stable solution mentioned above as a hardener for epoxy resin.

To render the above objects, technical features and advantages of the present invention more apparent, the present invention will be described in detail with reference to some embodiments hereinafter.

DESCRIPTION OF THE PREFERRED EMBODIMENT

The following will describe some embodiments of the present invention in detail with reference to the drawings appended. However, the present invention may be embodied in various embodiments and should not be limited to the embodiments described in the specification without departure from the spirit of the present invention. Furthermore, unless it is additionally explained, the expressions "a," "the," or the like recited in the specification (especially in the claims) should include the singular and the plural forms.

In the stable solution of the polymer prepared from an N,O-heterocyclic compound according to the present invention, the polymerization degree of the polymer and the quality of the solution can be well controlled by dissolving a proper N,O-heterocyclic compound into an organic solvent and then regulating the temperature. Specifically, according to the present invention, a proper N,O-heterocyclic compound is dissolved into an organic solvent to obtain a mixture; the mixture is then raised to a temperature higher than the softening point of the N,O-heterocyclic compound to carry out a ring-opening polymerization in the absence of a catalyst. The polymer thus obtained is kept in the solution for further applications without purification; and the properties such as molecular weight and gel time of the polymer can be controlled by regulating the temperature and the reaction time of the ring-opening polymerization to broaden the applications of the polymer solution. Especially, according to the method of the present invention, the progress of the ring-opening polymerization can be easily controlled by rapidly cooling the polymerization mixture to well-control the polymerization degree of the polymer.

Specifically, the method of the present invention comprises the following steps:
(a) dissolving an N,O-heterocyclic compound into a first solvent to form a first reaction solution;
(b) heating the first reaction solution to a first temperature to carry out a ring-opening polymerization; and
(c) cooling the first reaction solution to a second temperature to substantially
terminate the ring-opening polymerization, and thus obtaining a stable polymer solution, wherein, the first reaction solution is unreactive with the N,O-heterocyclic compound; the first temperature is higher than the softening point of the N,O-heterocyclic compound and lower than the boiling point of the first solvent; and the second temperature is lower than the first temperature.

In step (a), the N,O-heterocyclic compound has the structure of Formula I or II:

[Formula I]

[Formula II]

wherein, R1 to R3 are independently selected from the group consisting of H, a halogen (e.g., F, Cl and Br), a substituted or unsubstituted C1-C10 alkyl group, a substituted or unsubstituted C1-C10 cycloalkyl group, and a substituted or unsubstituted C6-C20 aryl group; W1 and W2 are independently selected from the group consisting of H, a halogen, an ether group (e.g., —CH$_2$OC$_2$H$_5$, —CH$_2$OCH$_3$, —C$_2$H$_4$OCH$_3$, —O— etc.), a thioether group, a sulfonyl group, a sulfinyl group, a carbonyl group, a substituted or unsubstituted C1-C10 alkyl group, a substituted or unsubstituted C1-C10 cycloalkyl group and a substituted or unsubstituted C6-C20 aryl group; m and n are independently an integer ranging from 1 to 4; p is an integer ranging from 1 to 3; and q is an integer ranging from 1 to 4.

In Formula I or Formula II, m and n are associated with W1 and W2 respectively. For example, in reference to Formula I, without being restricted by any theories, when m is 1, W1 is a group with a single bond, such as —H, —F, —Cl, —Br, —CH₃, etc. and the N,O-heterocyclic compound is the compound with one N,O-heterocyclic structure; when m is 2, W1 is a linking group with two bonds and the N,O-heterocyclic compound is the compound with two N,O-heterocyclic structures, and so forth. In the following examples, the desired N,O-heterocyclic compounds are provided by means of a chemical synthesis from a phenol compound, an aldehyde compound and an amine compound, as described therein.

In view of the polymerizing difficulty of the N,O-heterocyclic compound and properties of the polymer obtained therefrom, m and n are preferably independently 2 or 3. In this case, W1 and W2 are independently selected from the group consisting of an ether group; a thioether group; a sulfonyl group; a sulfinyl group; a carbonyl group; a C1-C10 alkyl group optionally with one or more substituents independently selected from the group consisting of an ether group, a thioether group, a sulfonyl group, a sulfinyl group and a carbonyl group; a C1-C10 cycloalkyl group optionally with one or more substituents independently selected from the group consisting of an ether group, a thioether group, a sulfonyl group, a sulfonyl group and a carbonyl group; and a C6-C20 aryl group optionally with one or more substituents independently selected from the group consisting of an ether group, a thioether group, a sulfonyl group, a sulfinyl group and a carbonyl group.

More preferably, m and n are 2, and W1 and W2 are independently selected from the group consisting of:

in this case, the N,O-heterocyclic compound has the structure of Formula I' or Formula II':

[Formula I']

[Formula II']

the following examples, the N,O-heterocyclic

In step (a) of the method of the present invention, the N,O-heterocyclic compound is dissolved into the first solvent to provide the first reaction solution, wherein the dissolving rate can be increased by, means of heating or stirring. The first solvent may be any inert solvent that can dissolve but un-react with the N,O-heterocyclic compound. Without being restricted by any theories, the boiling point of the first solvent should be at least higher than the maximum operating temperature involved in the preparation of the stable polymer solution according to the present invention, generally the temperature for the ring-opening polymerization, to avoid the first solvent from escaping during operation and thus change the concentration of the first reaction solution which may result in the difficulty for the subsequent process (e.g., the solution may become too thick to stir) or influence the quality of the prepared stable polymer solution (e.g., the polymerization degree may be non-uniform).

Generally, without departing from the above selection conditions, the first solvent, for example, may be a solvent selected from the group consisting of cyclohexanone, toluene, xylene, acetone, butanone, methyl isobutyl ketone, N,N-dimethyl formamide (DMF), N,N'-dimethyl acetamide (DMAc), N-methyl-pyrrolidone (NMP) and combinations thereof. In the following examples, cyclohexanone and DMF are used as the first solvent.

According to the method of the present invention, the first solvent can be used in any amount as long as sufficient for dissolving N,O-heterocyclic compound. When the amount of the first solvent is too low, the N,O-heterocyclic compound cannot be dissolved completely or the first reaction solution cannot be well-stirred. Moreover, in the case of significantly high N,O-heterocyclic compound concentration, the water generated from the ring-opening polymerization may severely influence the concentration of the first reaction solution and render the ring-opening polymerization uncontrollable. On the other hand, if the amount of the first solvent is too high, a great amount of energy must be consumed to raise the temperature of the first reaction solution, keep the desired ring-opening polymerization temperature, and cool down the solution to terminate the ring-opening polymerization. Therefore, in view of the production efficiency, the amount of the first solvent is generally about 5 parts by weight to about 60 parts by weight, preferably about 20 parts by weight to 40 parts by weight, per 100 parts by weight of the N,O-heterocyclic compound.

In step (b) of the method of the present invention, after the N,O-heterocyclic compound is dissolved into the first solvent evenly to form the first reaction solution, energy is supplied to heat the first reaction solution to a first temperature. The first temperature is at least higher than the softening point of the N,O-heterocyclic compound to carry out the ring-opening polymerization of the N,O-heterocyclic compound to prepare the stable solution containing the desired polymer without using expensive, environmentally hazardous catalysts. For example, in the preparation of polymers with structures of Formulae III and IV respectively from the ring-opening polymerization of the N,O-heterocyclic compounds in Formulae I' and II'

[Formula III]

[Formula IV]

the energy can be supplied to the first reaction solution to raise its temperature to the first temperature through, for example, thermal energy (such as water bath, oil bath, electrical heater, and heat exchanger), radiant energy (such as UV irradiation and γ-ray irradiation) or a combination thereof. To improve the heat transfer uniformity and reaction uniformity, it is preferable to stir the first reaction solution during the temperature-raising period. As described above, the first temperature should be lower than the boiling point of the first solvent to avoid the first solvent from escaping during operation and then change the concentration of the first reaction solution which may result in difficulty for the subsequent process or influence the quality of the prepared stable polymer solution. In the following examples, cyclohexanone (boiling point: about 155° C.) and DMF (boiling point: about 153° C.) are used as the first solvents, and the first temperature is about 130° C. to about 150° C.

During the process of the ring-opening polymerization, the polymerization degree of the obtained polymer may be determined by measuring the gel time of the product. When the first reaction achieves the desired polymerization degree, step (c) of the method of the present invention can be performed subsequently.

According to the method of the present invention, in step (c), the first reaction solution is cooled down from the first temperature to a second temperature that is lower than the first temperature by a rapid-cooling manner to substantially terminate the ring-opening polymerization and thus obtain the desired stable solution. The term "substantially terminate" means that the polymerization between the ring-opened compounds, between the polymers, or between the ring-opened compounds and the polymers are considerably ceased so that the gel time of the product varies slightly within the given storage period and can always meet the user's requirements. The lower the second temperature, the more remarkable the ceasing effects. On the contrary, the higher the second temperature, the less remarkable the ceasing effects. In addition, the faster the cooling rate of first reaction solution, the smaller the variation of gel time during the process of cooling. Theoretically, the second temperature can be controlled to approximately be the storage temperature (normally being the room temperature) to avoid the slight variation of the gel time during the process of lowering the temperature from the second temperature to the storage temperature, but a higher cooling cost is inevitable (e.g., a relatively great amount of cold solvent may used). Therefore, under the premise that the variation of the gel time during the cooling is acceptable, the second temperature is generally controlled to be below the softening point of the N,O-heterocyclic compound, preferably controlled to be at least 30° C. below the first temperature, and more preferably controlled to be at least 50° C. below the first temperature.

There is no special limitation on the means for the cooling in the step (c) of the method of the present invention. For example, an operation selected from the following group may be carried out with or without stirring: adding a second solvent into the first reaction solution, subjecting the first reaction solution to a gas atmosphere, subjecting the first reaction solution to a water bath, and combinations thereof, wherein the temperatures of the second solvent, the gas atmosphere and the water bath are lower than the second temperature. To achieve the desired rapid-cooling effect, it is preferably to carry out the cooling by means of adding a second solvent into the first reaction solution. In this manner, the added second solvent not only can contact with the first reaction solution directly to achieve the rapid-cooling effect, but also can dilute the concentration of the polymer and further prevent the polymerized N,O-heterocyclic compound from precipitation due to oversaturation during the process of cooling or at the storage temperature. In the following examples, the rapid-cooling is achieved by adding a second solvent into the first reaction solution or by subjecting the first reaction solution to a water bath.

In the case of adding a second solvent into the first reaction solution to terminate the ring-opening polymerization in step (c), the second solvent may be the same as or different from the first solvent, and may be any solvents which are unreactive with the ring-opened polymer. For example, the second solvent may be a polar solvent selected from the group consisting of toluene, xylene, acetone, butanone, methyl isobutyl ketone, cyclohexanone, N,N-dimethyl formamide and combinations thereof. In the following examples, acetone and butanone are used as the second solvent substantially terminate the ring-opening polymerization. Under the premise of terminating the ring-opening polymerization, there is no special limitation on the amount and temperature of the second solvent.

In the process of maintaining the first reaction solution at the first temperature to continuously performing the ring-opening polymerization, the longer the maintenance time of the first temperature, the higher the polymerization degree (i.e., the higher the molecular weight of the prepared polymer). On the contrary, the shorter the maintenance time of the first temperature, the lower the polymerization degree. It is found that according to the present invention, the polymerization rate can be changed by means of regulating the first temperature. The higher the first temperature, the faster the polymerization rate. On the contrary, the lower the first temperature, the slower the polymerization rate. Therefore, the method according to the present invention can arbitrarily regulate the polymerization degree of the ring-opening polymerization to provide the product with a desired gel time for the downstream by simply controlling the temperature and/or the reaction time.

The present invention also provides a stable solution of the polymer prepared from the N,O-heterocyclic compound by the above method. No precipitation from the stable solution would occur even when the solution is stored for a long period of time. In addition, since the structure of prepared polymer contains hydroxyl groups, it can provide a hardening effect on epoxy resin by reacting the epoxy resin with the hydroxyl groups, and thus can be used as a hardener for epoxy resin.

According to the present invention, as compared with the prior art which uses the N,O-heterocyclic compound as a hardener, the required hardening period of using the stable solution of the present invention as a hardener is shorter because the stable solution contains hydroxyl group-containing polymer prepared from the pre-polymerization of the N,O-heterocyclic compound. In addition, while using the stable solution of the present invention as a hardener, the hardening of the epoxy resin can be accomplished at a temperature below 200° C. Furthermore, as described above, the stable solution of the present invention is much more practicable since the gel time thereof can be adjusted to meet the requirement of the user.

The present invention will be further illustrated with reference to the embodiments hereinafter, wherein the measuring instruments and measurements are respectively as follows:

(A) Softening Point

The method for testing softening point comprises the following steps: obtaining a sample with a thickness higher than 0.6 mm and measuring the volume shrinkage of the sample from 25° C. to 400° C. by using a thermal mechanical analyzer (TA instruments). The changing point of volume shrinkage is regarded as the softening point.

(B) Gel Time

The method for testing gel time comprises the following steps: getting 0.2 g of stable solution of the polymer prepared from the N,O-heterocyclic compound as a sample and subjecting the sample to form a disc (2 cm² in area) on a hot plate at 200° C.; and calculating the time required for stirring the sample with a stirring rod until it does not adhere to the stirring rod or until it is going to be cured. The time required is regarded as the gel time.

EXAMPLES

The Preparation of N,O-Heterocyclic Compounds

784 g of bisphenol A, 458 g of aniline and 600 g of toluene were charged into a 3 L separable four-neck flask to form a synthetic solution. The four-neck flask was equipped with a heating device, a thermometer, a stirrer, a cooling pipe, a dropper and a decompression recovery device. The synthetic solution was heated to a temperature of about 40° C. and stirred evenly. While stirring, 809 g of 44% formaldehyde in toluene is dropped into the synthetic solution in 20 mins, and at this time, the temperature of the synthetic solution was raised to about 90° C. The synthetic solution was then heated to be kept at about 90° C. and reacted for 3 hours. Without being limited by theories, it is believed that the reaction is as follows.

After, the heating and stirring discontinues for about 20 mins, after which the synthetic solution was separated into two layers; the water phase and trace amount emulsion in the upper layer were removed. Instantly, the synthetic solution was again heated to about 90° C. and the solvent therein was recovered in a decompressing manner (the pressure was lower than about 90 mmHg). After the temperature raised to about 130° C. and the solvent was completely recovered, about 1380 g of N,O-heterocyclic compound 1 was obtained. The softening point of N,O-heterocyclic compound 1 measured by the above measurement (A) was about 63° C.

Once more, the synthetic solution was changed to the following combination: 564 g of phenol, 594 g of diaminodiphenylmethane (MDA) and 600 g of toluene. The procedures for preparing N,O-heterocyclic compound 1 were repeated and about 1288 g of N,O-heterocyclic compound 2 was obtained. The softening point of N,O-heterocyclic compound 2 measured by the above measurement (A) was about 69° C. Without being limited by theories, it is believed that the reaction is as follows.

Again, the synthetic solution was changed to the following combination: 564 g of phenol, 600 g of diaminodiphenyl ether (ODA) and 600 g of toluene. The procedures for preparing N,O-heterocyclic compound 1 were repeated and about 1291 g of N,O-heterocyclic compound 3 was obtained. The softening point of N,O-heterocyclic compound 3 measured by the above measurement (A) was about 71° C. Without being limited by theories, it is believed that the reaction is as follows.

Example 1

The Preparation of the Stable Solution of the Polymer from N,O-Heterocyclic Compound 1

Figure 1A:
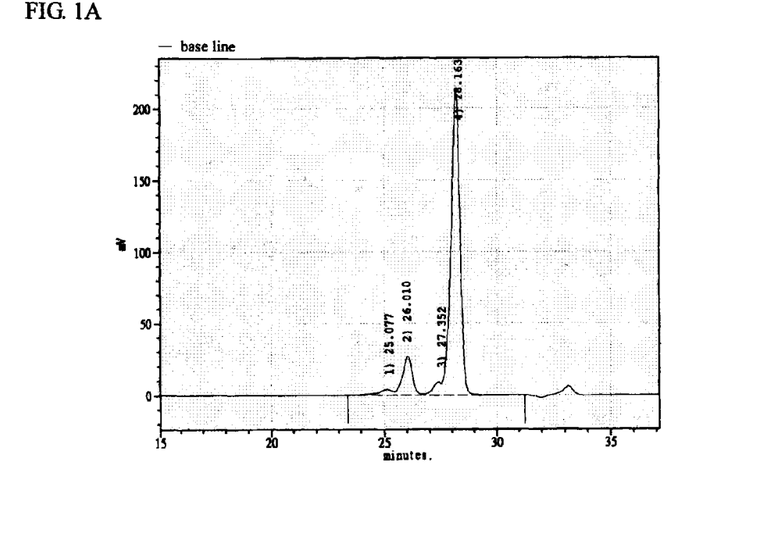
FIG. 1A illustrates the GPC spectrum of the N,O-heterocyclic compound used in an embodiment of the present invention.
Figure 1B:
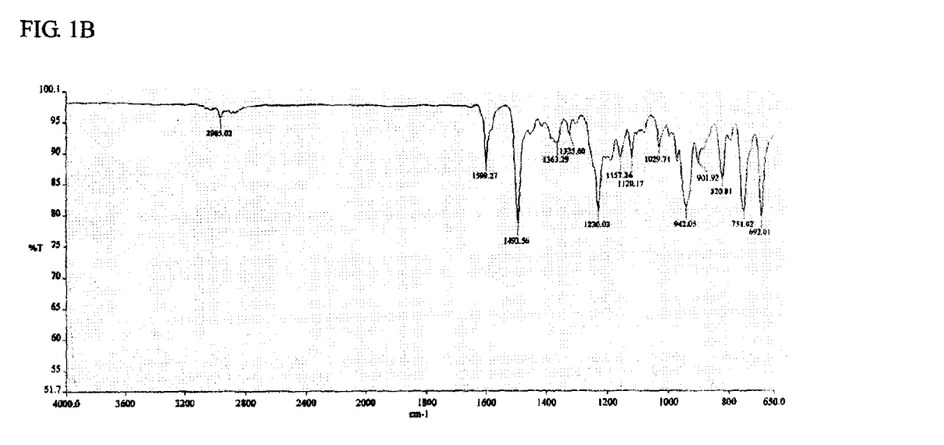
FIG. 1B illustrates the IR spectrum of the N,O-heterocyclic compound used in an embodiment of the present invention.

450 g of N,O-heterocyclic compound 1 and 115 g cyclohexanone were charged into a 1 L four-neck flask, which was equipped with a heating device, a thermometer, a stirrer, a cooling pipe, a dropper and a decompression recovery device. The resultant mixture was heated to 70° C. and then kept at 70° C. while stirring until the N,O-heterocyclic compound 1 was completely dissolved to form a pre-polymerization solution 1. The gel time at 200° C. of pre-polymerization solution 1 measured by the above measurement (B) was about 633 sec, and the GPC spectrum of the solution was measured by the Gel Permeation Chromatography (JASCO Company), as shown in FIG. 1A. Also, the IR spectrum of gelled N,O-heterocyclic compound 1 was further measured by the Fourier Transform Infrared Spectroscopy (PerkinElmer Company), as shown in FIG. 1B.

Next, the pre-polymerizing solution 1 was subjected to the ring-opening polymerization with step-temperature controlling, wherein the corresponding temperatures for each periods were shown in Table 1. After reacting for 320 min, butanone (185 g, 25° C.) was added to drop the temperature of the resultant solution to 94° C. rapidly, and then cooled to room temperature by natural cooling to terminate the ring-opening polymerization. Stable solution 1 with about 60 wt % polymer content was obtained. The gel time at 200° C. of stable solution 1 measured by the above measurement (B) was about 158 sec. The GPC spectrum of stable solution 1 and the IR spectrum of stable solution 1 after being gelled are subsequently analyzed and shown in FIGS. 2A and 2B respectively.

TABLE 1

| | Reaction temperature (° C.) | | | | | | | | | | | | | | | after cooling |
|---|---|---|---|---|---|---|---|---|---|---|---|---|---|---|---|---|
| | 130 | | | | | | 140 | | | | | | 150 | | | |
| Reaction time (min) | 0 | 30 | 60 | 90 | 120 | 150 | 170 | 190 | 210 | 240 | 270 | 285 | 300 | 310 | 320 | — |
| Gel time at 200 (sec) | 633 | 548 | 502 | 465 | 434 | 411 | 353 | 316 | 288 | 274 | 271 | 224 | 198 | 175 | 163 | 158 |

As shown in Table 1, the ring-opening polymerization is indeed terminated immediately after being cooled by butanone (the gel time merely varied slightly). Therefore, according to the method of present invention, the gel time of the finished product can be controlled by controlling the reaction time at different reaction temperature, and thus meet the requirements of various users.

Figure 2A:
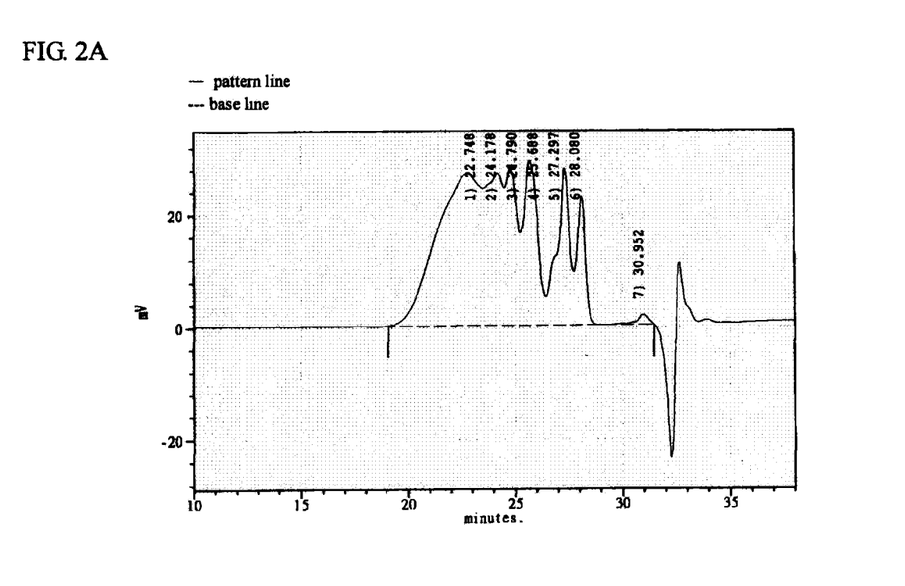
FIG. 2A illustrates the GPC spectrum of an embodiment of the stable solution of the present invention.
Figure 2B:
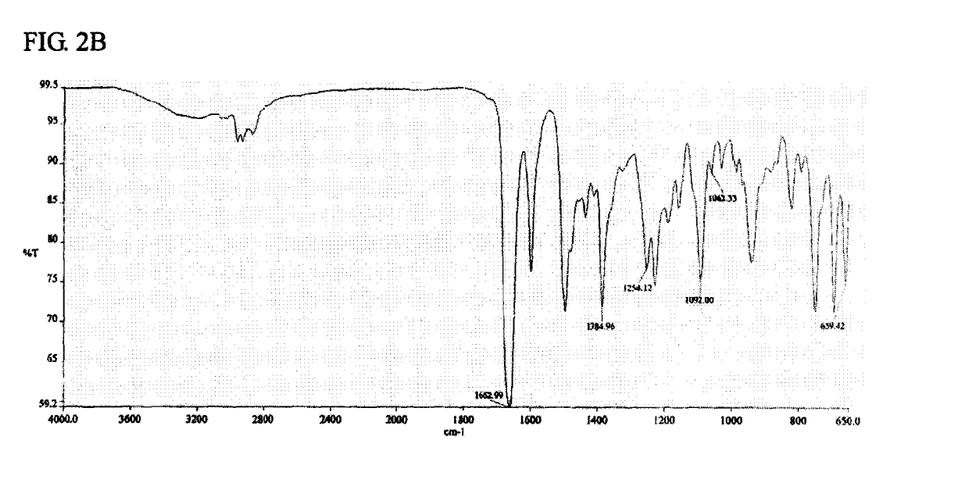
FIG. 2B illustrates the IR spectrum of an embodiment of the stable solution of the present invention.

By comparing FIGS. 1A and 2A, it can be found that, after carrying out the ring-opening polymerization to form stable solution 1, the strength of the peak (at about 28 min) of the original N,O-heterocyclic compound 1 was reduced and new broadband peaks 1), 2) and 3) appeared in the range of about 20 min to about 28 min. The comparison revealed the polymerization of N,O-heterocyclic compound 1 into polymers with larger molecular weights. A comparison between FIG. 1B and FIG. 2B revealed that, after carrying out the ring-opening polymerization to form stable solution 1, a broad absorption peak in the range of about 2800/cm to about 3600/cm and a sharp absorption peak at 1600/cm appeared. These absorption peaks are the characteristic absorption peaks for hydroxyl group, which evidences that the method of the present invention enables the N,O-heterocyclic compound to carry out the ring-opening polymerization and thus generate hydroxyl groups which can further react with epoxy resin.

Example 2

The Influence of the Species of the First Solvent

The preparation procedures of Example 1 were repeated except for using 115 g of DMF to replace cyclohexanone and carrying out the ring-opening polymerization according to the temperature controlling manner shown in Table 2. Stable solution 1' was obtained.

TABLE 2

| | Reaction temperature (° C.) | | | | | | | | | | | | | | | after cooling |
|---|---|---|---|---|---|---|---|---|---|---|---|---|---|---|---|---|
| | 130 | | | | | | | | 140 | | | | 150 | | | |
| Reaction time (min) | 0 | 20 | 50 | 80 | 110 | 140 | 160 | 180 | 200 | 230 | 260 | 275 | 290 | 305 | 320 | — |
| Gel time at 200 (sec) | 584 | 518 | 482 | 158 | 424 | 403 | 349 | 313 | 279 | 265 | 257 | 220 | 188 | 165 | 103 | 98 |

As shown in Table 2, the feature of the stable solution of the present invention in which the gel time of the solution can be controlled by choosing the reaction temperature and controlling the reaction time was also apparent while using other solvents.

Example 3

The Influence of the Species of N,O-Heterocyclic Compound 1293 g of N,O-heterocyclic compound 2 and 322 g of DMF were charged in a 1 L four-neck flask, which was equipped with a heating device, a thermometer, a stirrer, a cooling pipe, a dropper and a decompression recovery device. The resultant mixture was heated under stirring until the N,O-heterocyclic compound 2 was completely dissolved to form pre-polymerization solution 2. The gel time at 200° C. of pre-polymerization solution 2 measured by the above measurement (B) was about 551 sec.

Next, pre-polymerization solution 2 was subjected to the ring-opening polymerization with step-temperature controlling shown in Table 3. After reacting for 260 min, acetone (540 g, 25° C.) was added to drop down the temperature of the resultant solution to 78° C. rapidly, and then cooled to room temperature by natural cooling to terminate the ring-opening polymerization. Stable solution 2 with about 60 wt % polymer content was obtained. The gel time at 200° C. measured by the above measurement (B) was about 183 sec.

TABLE 3

| | Reaction temperature (° C.) | | | | | | | | | | | after cooling |
|---|---|---|---|---|---|---|---|---|---|---|---|---|
| | 110 | | | | | | | | | | | |
| Reaction time (min) | 0 | 20 | 50 | 80 | 110 | 140 | 170 | 200 | 230 | 250 | 260 | — |
| Gel time at 200 (sec) | 584 | 158 | 451 | 394 | 343 | 305 | 270 | 241 | 214 | 201 | 195 | 183 |

Further, a similar process was carried out to prepare stable solution 3. 1296 g of N,O-heterocyclic compound 3 and about 323 g of cyclohexanone were charged into a 1 L four-neck flask, which was equipped with a heating device, a thermometer, a stirrer, a cooling pipe, a dropper and a decompression recovery device, and the resultant mixture was heated under stirring until the N,O-heterocyclic compound 3 was completely dissolved to form a pre-polymerization solution 3. The gel time at 200° C. of pre-polymerization solution 3 measured by the above measurement (B) was about 615 sec.

Next, the pre-polymerization solution 3 was subjected to the ring-opening polymerization with the step-temperature controlling shown in Table 4. After reacting for 155 mins, butanone (about 541 g, at room temperature) was added to drop the temperature of the resultant solution down to 88° C. rapidly, and then cooled to room temperature by natural cooling termite terminate the ring-opening polymerization. Stable solution 3 with about 60 wt % polymer content was obtained. The gel time at 200° C. measured by the above measurement (B) is about 138 sec.

TABLE 4

| | Reaction temperature (° C.) | | | | | | after cooling |
|---|---|---|---|---|---|---|---|
| | 130 | | | | | | |
| Reaction time (min) | 0 | 40 | 80 | 120 | 140 | 155 | — |
| Gel time at 200 (sec) | 625 | 158 | 361 | 288 | 216 | 147 | 138 |

As shown in Tables 2 to 4, the feature of the stable solution of present invention in which the gel time of the product prepared therefrom can be controlled by choosing the reaction temperature and controlling the reaction time was also apparent while using different N,O-heterocyclic compounds.

Example 4

The Influence of the Means for Cooling the Temperature from the First Temperature to the Second Temperature 400 g of N,O-heterocyclic compound 1 and 400 g DMF were charged into a 1 L four-neck flask, which was equipped with a heating device, a thermometer, a stirrer, a cooling pipe, a dropper and a decompression recovery device. The resultant mixture was heated to 70° C. and kept at 70° C. while stirring until the N,O-heterocyclic compound 1 was completely dissolved to form a pre-polymerization solution 4. The gel time at 200° C. of pre-polymerization solution 1 measured by the above measurement (B) was about 641 sec.

Next, the pre-polymerization solution 4 was subjected to the ring-opening polymerization with the step-temperature controlling shown in Table 5. After reacting for 340 min, the temperature was cooled down to room temperature by shutting down the heat source and flushing the reaction flask with cold water at room temperature to terminate the ring-opening polymerization. Stable solution 4 with about 50 wt % polymer content was obtained. The gel time at 200° C. measured by the above measurement (B) was about 81 sec.

TABLE 5

| | Reaction temperature (°C.) | | | | | | | | | | | | | | | after cooling |
|---|---|---|---|---|---|---|---|---|---|---|---|---|---|---|---|---|
| | 130 | | | | | | | | 140 | | | | 150 | | | |
| Reaction time (min) | 0 | 30 | 60 | 90 | 120 | 150 | 170 | 190 | 210 | 240 | 270 | 290 | 310 | 325 | 340 | — |
| Gel time at 200 (sec) | 641 | 538 | 490 | 158 | 436 | 407 | 345 | 316 | 289 | 271 | 255 | 188 | 155 | 131 | 85 | 81 |

As shown in Table 5, the indirect cooling manner of using cold water was also effective for terminating the ring-opening polymerization (the gel time varied slightly after cooling).

Example 5

Storage Test

Storage sample: stable solution 1, stable solution 1', stable solution 2 and stable solution Storage condition: 10° C., normal pressure environment Storage duration: 30 days Testing results: no crystal precipitates is generated in all sample

It can be seen from the test results that unlike the prior arts where N,O-heterocyclic-containing benzene derivatives were used, the stable solution of the present invention can be stored for a long period of time under the normal conditions without precipitate due to oversaturation and poor solubility. The stable solution of the present invention is convenient for storage and use.

In view of the above, the method of the present invention can control the initiation and the termination of the ring-opening polymerization by means of controlling the temperature and can control the gel time of the obtained polymer by controlling the reaction time. As a result, the method can provide a stable solution of the polymer prepared from an N,O-heterocyclic compound, which can be directly used as a hardener for epoxy resin as an example. In addition, the stable solution of the polymer obtained from an N,O-heterocyclic compound according to the method of the present invention does not generate precipitate even when stored for a long period of time (at least 30 days) and therefore possesses excellent stability and storage properties.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A method for providing a stable solution of polymer prepared from an N,O-heterocyclic compound, comprising:
   (a) dissolving an N,O-heterocyclic compound of formula I or formula II into a first solvent to form a first reaction solution:

wherein,
R1 to R3 are independently selected from the group consisting of H, a halogen, a substituted or unsubstituted C1-C10 alkyl group, a substituted or unsubstituted C1-C10 cycloalkyl group, and a substituted or unsubstituted C6-C20 aryl group;
W1 and W2 are independently selected from the group consisting of H, a halogen, an ether group, a thioether group, a sulfonyl group, a sulfinyl group, a carbonyl group, a substituted or unsubstituted C1-C10 alkyl group, a substituted or unsubstituted C1-C10 cycloalkyl group and a substituted or unsubstituted C6-C20 aryl group;
m and n are independently an integer ranging from 1 to 4;
p is an integer ranging from 1 to 3; and
q is an integer ranging from 1 to 4;
(b) heating the first reaction solution to a first temperature to carry out a ring-opening polymerization; and
(c) cooling the first reaction solution to a second temperature to substantially terminate the ring-opening polymerization by adding a second solvent into the first reaction solution, wherein the temperatures of the second solvent is lower than the second temperature and the second solvent is unreactive to the polymer,
wherein, the first solvent is unreactive to the N,O-heterocyclic compound; the first temperature is higher than the softening point of the N,O-heterocyclic compound and lower than the boiling point of the first solvent; and the second temperature is lower than the first temperature.

2. The method of claim 1, wherein m and n are independently 2 or 3, and W1 and W2 are independently selected from the group consisting of an ether group; a thioether group; a sulfonyl group; a sulfinyl group; a carbonyl group; a C1-C10 alkyl group optionally with one or more substituents independently selected from the group consisting of an ether group, a thioether group, a sulfonyl group, a sulfinyl group and a carbonyl group; a C1-C10 cycloalkyl group optionally with one or more substituents independently selected from the group consisting of an ether group, a thioether group, a sulfonyl group and a sulfinyl group; and a C6-C20 aryl group optionally with one or more substituents independently selected from the group consisting of an ether group, a thioether group, a sulfonyl group and a sulfinyl group.

3. The method of claim 2, wherein m and n are 2, and W1 and W2 are independently selected from the group consisting of:

4. The method of claim 1, wherein in step (a), the amount of the first solvent is about 5 parts by weight to about 60 parts by weight per 100 parts by weight of the N,O-heterocyclic compound.

5. The method of claim 4, wherein the amount of the first solvent is about 20 parts by weight to about 40 parts by weight per 100 parts by weight of the N,O-heterocyclic compound.

6. The method of claim 1, wherein the first solvent is selected from the group consisting of cyclohexanone, toluene, xylene, acetone, butanone, methyl isobutyl ketone, N,N-dimethyl formamide (DMF), N,N'-dimethyl acetamide (DMAc), N-methyl-pyrolidone (NMP) and combinations thereof.

7. The method of claim 1, wherein the first solvent is cyclohexanone or N,N-dimethyl formamide.

8. The method of claim 1, wherein the second solvent is selected from the group consisting of toluene, xylene, acetone, butanone, methyl isobutyl ketone, cyclohexanone, N,N-dimethyl formamide and combinations thereof.

9. The method of claim 1, wherein the second temperature is at least 30° C. below the first temperature.

10. The method of claim 9, wherein the second temperature is at least 50° C. below the first temperature.

11. The method of claim 1, wherein the second temperature is about room temperature.

* * * * *